United States Patent [19]

Gens

[11] Patent Number: 4,550,098

[45] Date of Patent: Oct. 29, 1985

[54] METHODS FOR THE REMOVAL OF GASEOUS IMPURITIES FROM MIXED GAS STREAMS

[75] Inventor: Theodore A. Gens, Lake Zurich, Ill.

[73] Assignee: The BOC Group, Inc., Montvale, N.J.

[21] Appl. No.: 441,383

[22] Filed: Nov. 12, 1982

[51] Int. Cl.[4] .................. B01J 21/04; B01J 23/78; C01B 17/04; B01D 53/34

[52] U.S. Cl. .................. 502/324; 502/330; 502/346; 423/230; 423/573 G; 252/191; 252/192

[58] Field of Search .......... 423/230, 231, 573 G; 252/191, 192; 502/346, 345

[56] References Cited

U.S. PATENT DOCUMENTS

| | | |
|---|---|---|
| 1,912,877 | 6/1933 | Woodhouse . |
| 1,922,872 | 8/1933 | Thompson ............... 23/225 |
| 1,971,168 | 8/1934 | Weiss ...................... 23/234 |
| 2,200,529 | 9/1940 | Baehr et al. ............. 23/226 |
| 2,273,297 | 2/1942 | Szayna ..................... 252/191 X |
| 2,594,149 | 4/1952 | Gamson ................... 23/225 |
| 2,747,968 | 5/1956 | Pigache ................... 423/230 |
| 2,992,884 | 7/1961 | Bienstock et al. ....... 252/192 X |
| 3,199,946 | 8/1965 | Fujita et al. ............ 252/191 X |
| 3,374,270 | 3/1968 | Hausen et al. ........... 502/346 X |
| 3,579,293 | 5/1971 | Shultz et al. ............ 423/231 |
| 3,914,389 | 10/1975 | Haacke ................... 423/263 |
| 4,001,371 | 1/1977 | Remeika et al. ......... 423/213.2 |
| 4,088,736 | 5/1978 | Courty et al. ........... 252/192 X |
| 4,164,545 | 8/1979 | Scott ....................... 423/239 |
| 4,171,347 | 10/1979 | Hass ........................ 423/539 |
| 4,233,175 | 11/1980 | Delmon et al. ......... 252/192 |
| 4,252,778 | 2/1981 | Yang et al. .............. 423/230 |
| 4,299,719 | 11/1981 | Aoki et al. .............. 423/231 X |
| 4,370,161 | 1/1983 | Turkdogan ............. 423/230 X |

FOREIGN PATENT DOCUMENTS

| | | | |
|---|---|---|---|
| 48-2117 | 1/1973 | Japan ................ 423/231 |
| 49-22391 | 2/1974 | Japan ................ 423/230 |
| 0039965 | 4/1978 | Japan ................ 423/231 |
| 0152661 | 12/1979 | Japan ................ 423/230 |
| 0073328 | 6/1980 | Japan ................ 423/231 |
| 1219281 | 1/1971 | United Kingdom ......... 502/346 |
| 0874135 | 10/1981 | U.S.S.R. .............. 423/230 |

OTHER PUBLICATIONS

Gamson and Elkins, Sulfur from Hydrogen Sulfide, Chem. Eng. Prog., 49, 203-15 (1953).

Grekel, $H_2S$ to S . . . by Direct Oxidation, Oil and Gas Journal, 57, 76-79 (1959).

Goar, Today's Gas-Treating Processes-2, Oil and Gas Journal, 84, 86 (1971).

(List continued on next page.)

*Primary Examiner*—Donald R. Valentine
*Attorney, Agent, or Firm*—David L. Rae; Larry R. Cassett

[57] ABSTRACT

Methods are disclosed for the purification of mixed gas streams containing hydrogen sulfide, carbon dioxide, carbon monoxide, sulfur, hydrogen, and methane and other hydrocarbon gases, and mixtures thereof, by the use of an oxidizing reactive solid. In one method, the oxidizing reactive solid is, in a first step, contacted with the mixed gas stream which may contain, among other gases, hydrogen sulfide and carbon dioxide. The reactive solid removes the hydrogen sulfide in the form of elemental sulfur with no detectable formation of sulfur oxide. The reactive solid also partially removes the carbon dioxide from the mixed gas stream. In the second step of the first method, the oxidizing reactive solid is regenerated by flowing air. In a second method of the present invention, mixed gas streams, containing hydrogen sulfide and oxygen in an approximate stoichiometric amount, are contacted with the solid, and hydrogen sulfide is converted directly to sulfur with minimal formation of compounds of sulfur. The oxidizing reactive solid has the general formula D-M-O, wherein D is chosen from the alkali metals or alkaline earth metals comprising sodium, potassium, lithium, calcium or magnesium; M represents a transition metal selected from the group comprising manganese, copper, and iron, and groups IB, VB, VIB, VIIB or VIII from the Periodic Table; and O designates oxygen.

20 Claims, 13 Drawing Figures

OTHER PUBLICATIONS

Slack and James, Ammonia, Part II, p. 338 (1974).
Chowdhury and Datta, Recovery of Elementary Sulphur from Gases Containing Sulphuretted Hydrogen, Ind. Chem. Soc., 20, 253 (1943).
Herbstein, Ron and Weissman, The Thermal Decomposition of Potassium Permanganate and Related Substances, J. Chem. Soc. (A), 1821 (1971).
Thorne and Roberts, Inorganic Chemistry, Interscience Publishers, Inc., New York, (2949) (pp. 482–485) (1949).
Brendel and Klemm, Weitere Versuche zur Darstellung von Kaliumcobaltat(V), Zeitschrift fur anorganische und allgemeine Chemie, 320, 59 (1963).
Scholder and Protzer, Uber Alkalimanganate(III) bis(V), Zeitschrift fur anorganische und allgemeine Chemie, 369, 313 (1969).
Scholder, Schwochow and Schwarz, Uber Alkalichromate(V), Zeitschrift fur anorganische und allgemeine Chemie, 363, 10 (1968).

SPACE VELOCITY, BED VOLS/HR OF 5% H₂S·He

METHODS FOR THE REMOVAL OF GASEOUS IMPURITIES FROM MIXED GAS STREAMS

BACKGROUND OF THE INVENTION

1. Field of the Invention

The present invention relates to the use of oxidizing reactive solids for the oxidation of hydrogen sulfide gas and the removal of hydrogen sulfide and other gasses such as carbon dioxide from gas streams containing one or more of the following: hydrogen sulfide, oxygen, carbon dioxide, carbon monoxide, sulfur, hydrogen, water vapor, methane and other hydrocarbon gasses.

2. Description of the Prior Art

Removal of oxidizable impurities such as hydrogen sulfide alone or in the presence of other gasses in the absence or in the presence of high temperature oxidation catalyst has been the subject of extensive research because of the desirability of purifying such mixed gas streams for environmental and other reasons.

As discussed by Gamson and Elkins [Chem. Eng. Prog. 49, 203–15 (1953)], a widely used commercial process for removal of hydrogen sulfide from gas streams is the Claus process. The original Claus process has evolved through several modifications and improvements, but the basic chemical reactions remain unchanged. The overall result of the Claus process is the conversion of hydrogen sulfide to sulfur:

$$H_2S + \tfrac{1}{2}O_2 \rightarrow H_2O + \text{Sulfur}(v) \qquad (1)$$

As noted in Gamson, et al., Chem. Eng. Prog. 49, 203 (1953), the term "Sulfur (v)", hereinafter referred to as simply "S (v)", signifies complex equilibria existing between the elemental forms of sulfur in the vapor state.

In practice Reaction (1) is actually a summation of two reactions. In the first reaction, one-third of the hydrogen sulfide is oxidized to sulfur dioxide in an uncatalyzed gas-phase combustion:

$$\tfrac{1}{3}H_2S + \tfrac{1}{2}O_2 \rightarrow \tfrac{1}{3}H_2O + \tfrac{1}{3}SO_2 \qquad (2)$$

The products of Reaction (2), along with the remaining two-thirds of the hydrogen sulfide, are reacted over a bed of bauxite or alumina catalyst at about 200° C. to 400° C.:

$$\tfrac{2}{3}H_2S + \tfrac{1}{3}SO_2 \rightarrow \tfrac{2}{3}H_2O + S(v) \qquad (3)$$

The bed must be maintained at a sufficiently high temperature in order to prevent condensation of sulfur because difficulties, such as catalyst poisioning, are encountered in the Claus process at low temperature. On the other hand, because the reaction becomes thermodynamically more favorable at a lower temperature, it is desirable to carry out Reaction (3) at as low a temperature as is feasible.

Attempts have been made to carry out direct oxidation of hydrogen sulfide to sulfur by Reaction (1), thereby avoiding the thermodynamic limitations imposed by Reaction (3). An example of this process is disclosed by Baehr, et. al. (U.S. Pat. No. 2,200,529). That patent purports to disclose a converson of a large fraction of hydrogen sulfide directly to sulfur in a free flame in the presence of the stoichiometric amount of oxygen.

Gamson (U.S. Pat. No. 2,594,149) noted that Reaction (1) becomes the principal reaction at very high temperatures. That patent discloses a process for converting hydrogen sulfide directly to sulfur in yields of about 75% at temperatures above about 1300° C., followed by a rapid cooling of the product gasses to minimize formation of sulfur dioxide by reaction of residual oxygen and sulfur product. Gamson also discloses that the oxidation of hydrogen sulfide does not appear to proceed at a practical rate at temperatures below about 500° C. in the absence of catalysts. The patent to Gamson does not disclose a catalytic, low temperature conversion of the type disclosed in the present invention.

An article by Grekel, Oil and Gas Journal Vol. 57, 76–79 (1959), discloses a method for the direct oxidation of hydrogen sulfide to sulfur in the presence of bauxite at temperatures between about 200° C. and about 800° C. Grekel states that, at low space velocities, lower temperatures are preferred, inferring that Reaction (3) is involved. Grekel further implies that at higher space velocities, Reaction (3) becomes less important.

The patent to Thompson (U.S. Pat. No. 1,922,872) discloses a method of oxidizing hydrogen sulfide to sulfur in the presence of oxygen over a bauxite catalyst in the temperature range from about 225° C. to about 275° C. The Thompson catalyst contained about 60% alumina as well as small percentages of ferric oxide, titanium dioxide, and silica. The preferred low temperatures of the Thompson disclosure would seem to suggest that Reaction (3) is controlling. However, the catalyst at the reported temperatures displays a tendency to collect sulfur vapors which poison the catalyst.

Hass (U.S. Pat. No. 4,171,347) discloses a method for the conversion of hydrogen sulfide directly to sulfur in the presence of oxygen and a vanadium oxide catalyst on a non-alkaline support at temperatures from about 120° C. to about 230° C. The vanadium oxide catalyst appears to convert a portion of the hydrogen sulfide to sulfur dioxide. The sulfur dioxide product seems to react with unreacted hydrogen sulfide, for example by Reaction (3), on the same catalyst bed, to form sulfur.

The patent issued to Scott (U.S. Pat. No. 4,164,544) discloses a cyclic process for desulfurizing hot reducing gas by contacting the gas with a desulfurizing agent, regenerating the spent desulfurizing agent, and then reusing the regenerated desulfurizing agent. As disclosed in Scott, a bed of sintered porous pellets comprising the reaction product of manganese oxide and aluminum oxide as the desulfurizing agent is used. Regeneration of the desulfurizing agent is performed by contacting the bed of pellets with an oxidizing gaseous atmosphere. The Scott process appears to result in the formation of only SO$_2$, in contrast with the present invention in which little or no SO$_2$ is formed depending on the mode of operation. In Scott, the temperature of the bed is maintained between about 500° C. and about 1300° C. in both the desulfurization and regeneration step. Although Scott uses the term "reaction product" to describe the porous pellets, this term apparently is not meant to indicate a chemical reaction between manganese oxide and aluminum oxide; rather, the term appears intended to describe the product produced by intimately mixing manganese oxide with aluminum oxide, forming the mixture into a pellet, and sintering, by heating the pellet.

In the "iron-sponge" process, as discussed by Goar, Oil and Gas J. 84, 86 (1971), hydrogen sulfide is reacted with ferric oxide to form ferric sulfide. Although the bed of ferric sulfide appears to be able to be reconverted by air oxidation to ferric oxide, the bed eventually becomes saturated with sulfur solids and must be replaced. The iron-sponge process is usually limited to treating gasses containing low concentrations of hydrogen sulfide, due to the economics of bed replacement. Furthermore, the sulfur removed by this process is usually lost because the "spent" bed of iron oxide is usually discarded.

Zinc oxide appears to be frequently used to remove hydrogen sulfide from mixed gas streams containing low concentrations of hydrogen sulfide. ("Ammonia" Part II, A. V. Slack and G. R. James, Marcel Dekker, Inc., New York, 1974, p. 338). This application resembles that of the iron-sponge process; the zinc sulfide product cannot be readily regenerated and is usually discarded after a single application.

The patent to Weiss (U.S. Pat. No. 1,971,168) discloses the preparation of oxidation catalysts represented by the general formula $M(HMnO_3)_2$ and $M(MnO_3)$ wherein the symbol M represents one of various possible metals capable of forming the catalyst in association with manganese. These metals, termed acid manganites, were shown to be useful in the oxidation of carbon monoxide to carbon dioxides. The Weiss patent does not disclose removal of any impurity other than carbon monoxide from a mixed gas stream.

The U.S. patent issued to Haacke (U.S. Pat. No. 3,914,389) discloses a compound having the empirical formula $LaCu_{0.5}Mn_{0.5}O_3$ as an oxidation catalyst to convert carbon monoxide to carbon dioxide in automobile exhaust systems.

The patent issued to Remeika et al. (U.S. Pat. No. 4,001,371) discloses a catalyst of the formula $La_{0.8}K_{0.2}MnO_3$ to catalyze the conversion of $NO_x$ pollutants to materials $N_2O$, $N_2$, and oxygen. This catalyst is also said to be effective for promoting reactions such as the oxidation of carbon monoxide to carbon dioxide. Each of the catalysts disclosed in the Remeika patent requires the presence of at least one rare earth element, i.e., La, Pr, and Nd, as a component.

None of the above descriptions or disclosures disclose the methods of the present invention in which a reactive solid is used for removing impurities such as hydrogen sulfide and carbon dioxide from gas mixtures.

SUMMARY OF THE INVENTION

The present invention relates to the use of an oxidizing reactive solid which may be used to oxidize gasses such as hydrogen sulfide and to remove hydrogen sulfide and carbon dioxide from gas streams containing one or more of the following: hydrogen sulfide, oxygen, carbon dioxide, carbon monoxide, sulfur, hydrogen, water vapor, methane and other hydrocarbon gasses.

As discussed more fully hereinafter, the present invention involves the use of oxidizing reactive solids which oxidize hydrogen sulfide contained in mixed gas streams with the products being primarily sulfur and water. The solids may also be used to remove carbon dioxide from mixed gas streams.

For the purposes of this disclosure, the oxidizing reactive solid is generally referred to as "D-M-O", wherein D is chosen from the alkali metals and alkaline earth metals comprising potassium, sodium, lithium, calcium and magnesium, M is chosen from the group comprising manganese, copper, iron, and groups VB, VIB, VIIB, VIII, and IB of the Periodic Table, Lange's Handbook of Chemistry, Twelfth Edition,; and O represents oxygen.

In the present invention, it has been discovered that a portion of the oxygen in the D-M-O reactive solid reacts readily with gaseous hydrogen sulfide to yield as products only sulfur and water. This oxygen, hereinafter referred to as "active oxygen", may be readily introduced into the D-M-O reactive solid.

The oxidizing reactive solids used in the present invention containing active oxygen appear to react by a mechanism different from that of transition metal oxides which do not contain active oxygen. The latter oxides react with hydrogen sulfide to form compounds of sulfur rather than elemental sulfur. The oxidizing reactive solids of the present invention yield elemental sulfur to the extent of their active oxygen content. If such solids are contacted with gaseous hydrogen sulfide after the active oxygen content is depleted, compounds of sulfur rather than elemental sulfur will be formed.

A useful and advantageous characteristic of the oxidizing reactive solids used in the present invention herein is that they react readily with oxygen, thereby replenishing the active oxygen content.

The present invention may be either used isothermally in a catalytic mode or in a cyclic two-step mode. In the catalytic mode, gas streams containing hydrogen sulfide, carbon dioxide, carbon monoxide, and the like is passed over a bed containing the oxidizing reactive solid in the presence of an approximate stoichiometric amount of oxygen necessary for the conversion of hydrogen sulfide to sulfur. The temperature of the bed is maintained between about 300° C. and about 700° C. The lower temperature limit is constrained by the minimum temperature at which the sulfur vapors remain in the gas phase. If sulfur vapors condense on the reactive solid or in the reaction zone it is likely that increased amounts of sulfur oxides will be formed. About 80% conversion of hydrogen sulfide to sulfur can be achieved throughout the identified temperature range with minimal formation of sulfur dioxide.

As noted, the method of the present invention can also be practiced in a two-step cyclic manner. In the first step, a gas stream containing hydrogen sulfide, carbon monoxide, carbon dioxide, and other gasses is passed over a bed containing the oxidizing reactive solid. In this step, the solid reacts directly with the hydrogen sulfide in the gas stream to form elemental sulfur. In the second step, the oxidizing reactive solid is regenerated and the active oxygen replaced by flowing air or $O_2$ at atmospheric or higher pressure over the reactive solid at a temperature and for a period of time sufficient to regenerate the reactive solid. This two-step process can be performed repeatedly, with the bed being regenerated and reacted numerous times without apparent loss of bed reactivity.

The D-M-O compounds display the ability to reversibly remove carbon dioxide. This property causes a partial removal of carbon dioxide from a stream of mixed gasses, when applied in a two-step cyclic process as described above.

It is thus an object of this invention to facilitate the direct oxidation of hydrogen sulfide to sulfur through the use of an approximate stoichiometric amount of oxygen and in the presence of the oxidizing reactive solid according to the following reaction:

$$H_2S + \tfrac{1}{2}O_2 \rightarrow H_2O + S(v)$$

It is a further object of this invention to facilitate the above reaction either by catalytic or direct chemical reaction.

It is yet a further object of this invention to remove $CO_2$, $H_2S$, and S gasses from gas streams.

It is a further object of this invention to remove hydrogen sulfide from mixed gas streams using a process in which the bed of the oxidizing reactive solid is reacted by contact with the gas stream, followed by regeneration of the oxidizing reactive solid; a process which may be performed numerous times without significant loss of reactivity of the reactive solid.

It is a further object of this invention to use the reactive solid in a method for the removal of carbon dioxide from mixed gas streams.

Another object of the present invention is to provide a method which may be economically employed in the purification of gas streams, and more specifically in the removal of hydrogen sulfide and carbon dioxide from said gas streams.

These and other objects and advantages of the present invention will become apparent with reference to the drawings and the detailed description of the invention which follow hereinafter.

DETAILED DESCRIPTION

The present invention discloses the use of D-M-O oxidizing reactive solids which are useful for the removal of gaseous impurities, such as, for example, hydrogen sulfide, and carbon dioxide, typical of those found in the gaseous by-product of coal combustion.

In forming the D-M-O solid, the precursor of the solid, in which the M component thereof, such as for example Mn, possesses a high positive valence, is heated to elevated temperatures under an inert atmosphere. In such situation, the M component is reduced to a lower positive valence. An alternative procedure comprises reacting a nitrate of the M component in a strongly alkaline solution, thus oxidizing the M component of the D-M-O to a higher positive valence. Either of such procedures effectively produces the oxidizing reactive solid.

D-M-O solids prepared in either of the foregoing methods have a low density. These low-density solids tend to develop a resistance to the flow of gas after use. In order to alleviate this situation, it is preferred that the reactive solid be formed into pellets and that the pelletized form be used in practicing the method of the present invention.

Alternatively, as described hereinafter, the D-M-O solid may be prepared intimately mixed with a small percentage of alumina and thereafter formed into pellets. Such pellets display superior physical strength and lower alkalinity when compared to those prepared without alumina.

The method of present invention relating to the use of the D-M-O solid generally may be described as a method for removing the hydrogen sulfide from gas streams containing $H_2S$, including those gasses formed during coal combustion. This method converts the hydrogen sulfide to sulfur, an oxidation which stops at elemental sulfur; that is, no sulfur oxides are formed.

The D-M-O reactive solid is easily reoxidized, such that it may be regenerated in a continuous, cyclic process.

The generalized chemical reactions which occur when using the D-M-O solid in the method of the present invention may be depicted as follows. The D-M-O reactive solid is reduced and hydrogen sulfide is oxidized to form sulfur vapors as follows:

$$D\text{-}M\text{-}O_{x+y} + YH_2S \rightarrow D\text{-}M\text{-}O_x + YH_2O + YS(v) \qquad (4)$$

The D-M-O reactive solid is then regenerated by contacting the reduced D-M-O solid with oxygen:

$$D\text{-}M\text{-}O_x + Y/2 O_2 \rightarrow D\text{-}M\text{-}O_{x+y} \qquad (5)$$

The oxygen, when incorporated in the reactive solid, is active in the desired reaction:

$$[O] + H_2S \rightarrow H_2O + S(v) \qquad (6)$$

where [O] designates the active oxygen fixed in the reactive solid by Reaction (5). Thus, Reaction (6) is the net reaction of Reactions (4) and (5).

Figure 1:
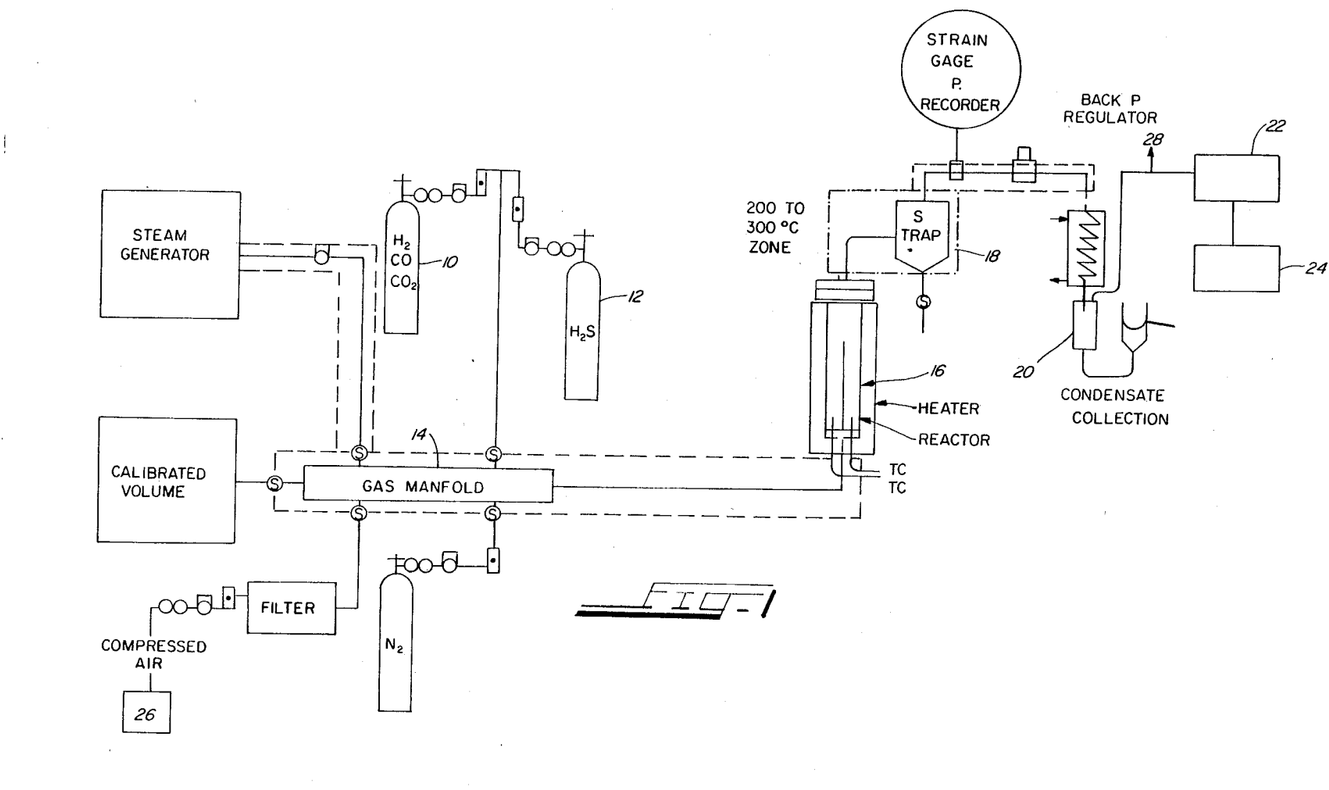
FIG. 1 is a schematic illustration of the apparatus used in investigating the methods of the present invention.

The two methods of practicing the present invention may be best understood with reference to FIG. 1. In the catalytic mode, a feed gas (for example, as obtained from tanks 10 and 12 which may contain, respectively, $H_2$, CO, and $CO_2$ in tank 10 and $H_2S$ in tank 12) is mixed in a gas manifold 14. The feed gas may also comprise a mixture of hydrogen sulfide, oxygen, nitrogen, or inert gas such as helium or argon. The ratio of hydrogen sulfide to oxygen is adjusted to approximately that amount necessary to satisfy the stoichiometry of Reaction 1. The mixture is then passed into a reactor 16 which is heated to temperatures between about 300° C. to about 700° C. The space velocity of the gas flowing into the reactor may vary between about 100 to about 10000 hr$^{-1}$. In the reactor 16, the gasses contact a bed (not shown) which comprises one of the D-M-O reactive solids, preferably in pelletized form, of the present invention. The D-M-O reactive solid, described more fully hereinafter, rapidly converts the mixture of hydrogen sulfide and oxygen to sulfur, with minimal formation of sulfur dioxide. The effluent containing sulfur vapors passes out of the reactor 16 and sulfur is condensed in sulfur trap 18. The effluent containing the remaining gasses is then collected in gas collector 22 for analysis by gas chromatograph 24. Excess gas may then be released through vent 28. Gasses susceptible to condensation under these conditions, such as water vapor are removed in condensate collector 20.

In the two-step process of the present invention, the feed gas consists of hydrogen sulfide in a carrier gas such as helium or argon, or in a mixed gas containing one or more of the following: carbon dioxide, nitrogen, hydrogen, steam and carbon monoxide. The feed gas is flowed to the gas manifold 14 where it is mixed and then transferred into the reactor 16. After the hydrogen sulfide has reacted with the reactive D-M-O solid, the reactor 16 is flushed with an inert gas for sufficient time so as to clear the reactor of all sulfur vapors formed during the first step which are vaporized and trapped in the sulfur trap 18. The reactive solid of the present invention is then reactivated by flowing oxygen or by air from tank 26 into the reactor 16 at temperatures between about 280° C. and 600° C.

In order to more fully understand the present invention, a series of examples will be given. However, in order to appreciate these examples, and the advantageous properties displayed by the D-M-O solid in the method of the present invention, it is first necessary to summarize the chemical reaction mechanisms thought to occur when the D-M-O solid is used. In order to do so, particular reference to the reactive solid containing potassium, manganese and oxygen (hereinafter "K-Mn-O") will be made. It should be appreciated that the following mechanisms are believed, based on experimental data, to occur. Thus, they are presented not by way of limitation.

In the reaction of the K-Mn-O compound with H$_2$S, the K-Mn-O compound is reduced and hydrogen sulfide is oxidized to elemental Sulfur as follows:

$$KMnO_{x+y} + YH_2S \rightarrow KMnO_x + YH_2O + YS \tag{7}$$

The K-Mn-O compound is oxidized and regenerated by flowing air containing O$_2$, or by pure O$_2$ over the bed containing this compound:

$$KMnO_x + Y/2O_2 \rightarrow KMnO_{x+y} \tag{8}$$

With the net reaction:

$$YH_2S + Y[O] \rightarrow YH_2O + YS(v) \tag{9}$$

This reaction sequence is indicative of the catalytic reaction with H$_2$S in the presence of oxygen [O] of the reactive solid to form elemental sulfur and water.

The preparation of the reactive solid containing potassium, manganese and oxygen and the use of the solid so produced in the method of the invention are described in the following examples.

EXAMPLE I

The K-Mn-O reactive solid is prepared as follows: One gram-mole (158 g) of KMnO$_4$ is placed in a large boat centered in a tube in a horizontal tube furnace. A slow stream of argon is passed through the tube. After about ½ hour the temperature, measured inside the tube, is 600° C. At that point the tube is cooled to room temperature under argon atmosphere. A voluminous product (bulk volume 180 cc) is obtained, weighing 131.8 g. By assigning all the weight loss to oxygen, the composition of the product is calculated as KMnO$_{2.4}$.

The K-Mn-O compound prepared as described herein is a loose powder with a bulk density as low as about 0.6 g per cc, and has the tendency to sinter and develop a noticed resistance to the flow of gas during extended use.

This powder form is modified to increase its density and to inhibit sintering. The powder product (3 g) is loaded into a one-inch diameter cylindrical die and pressed (about 1,000 lbs. to about 2,000 lbs. of applied pressure) into discs less than 0.1 inch thick. The density of the pressed material approaches about 3 g per cc. The discs are embrittled by baking in air for ½ hour at 150° C., and broken into irregularly shaped pieces. The bulk density of a bed of these pellets in the reactor 16 shown in FIG. 1 is about 0.9 g per cc.

EXAMPLE II

An alternative preparation of the K-Mn-O compound which contains alumina is as follows: One mole of KMnO$_4$ (158 g.) is dissolved in 1.5 liters of warm water. A solution of aluminum nitrate (0.03 moles in 0.1 liter of warm water) is added to the first solution. The combined solution is dried to a solid cake and heated to 600° C. for ½ hour under argon atmosphere. The alumina content is calculated at about 2% by weight. This product is crushed to a fine powder and pressed into 3/16"×1" discs. The discs are embrittled by baking in air for ½ hour at 150° C., and broken into small pieces. The K-Mn-O compound is prepared in this manner to improve its resistance to crumbling and sintering and to decrease its alkalinity.

EXAMPLE III

In order to establish the oxidizing ability of the K-Mn-O compound to H$_2$S, the following test is performed. The K-Mn-O compound prepared as described in Example I and reacted with carbon dioxide for about 80 cycles as described in Example VIII is loaded into the reactor 16 of FIG. 1.

The reactor as shown in FIG. 1 is heated to 300° C., flushed with argon at 1 atm. and pressurized to 3.7 atm. with H$_2$S. As shown in Curve A of FIG. 2, H$_2$S pressure decreases rapidly showing that H$_2$S is removed from the gas stream. Sulfur and water vapor are observed in the effluent.

Figure 2:
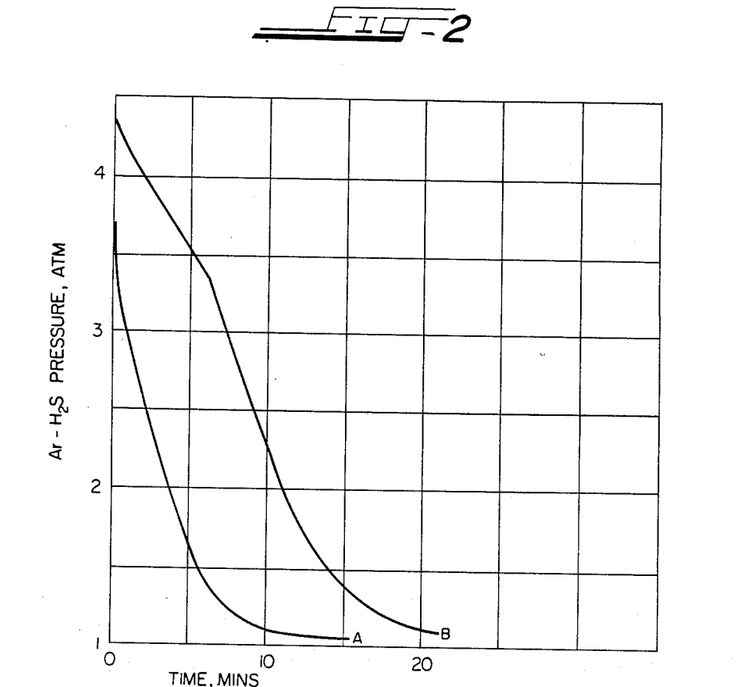
FIG. 2 is an illustration of the rate of reaction of pure $H_2S$ with the K-Mn-O Compound at two different initial $H_2S$ pressures.

The bed is then contacted with air at about 300° C. for a period of time necessary to reoxidize the K-Mn-O compound. Reoxidation is indicated by a rapid increase of about 20° C. observed in the bed temperature.

After reoxidation, the bed is again contacted with $H_2S$ at an initial pressure of 4.3 atmospheres. Again the $H_2S$ pressure decreases rapidly as shown in Curve B of FIG. 2, further establishing the removal of $H_2S$ from the gas stream. A uniform green compound of about 1 mm. thick is formed on the surface of the compressed K-Mn-O pellets during this reaction, indicative of divalent manganese, sulfur material. It appears that if the K-Mn-O compound is exposed to $H_2S$ in excess of its active oxygen content, the K-Mn-O compound is reduced, and forms a green manganese-sulfur material.

EXAMPLE IV

Figure 3:
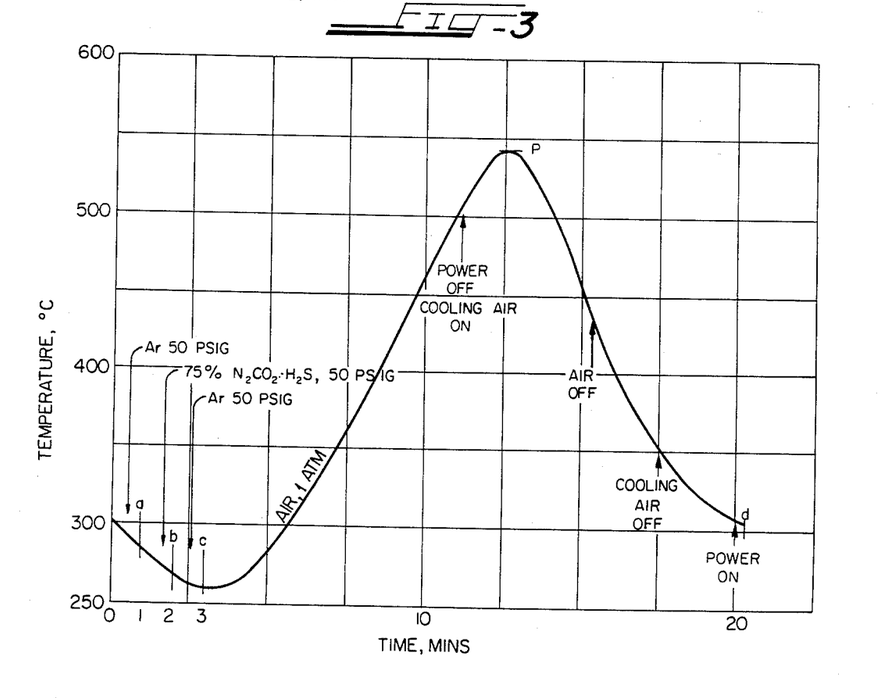
FIG. 3 is a graphical illustration of a typical temperature cycle showing the various features of the cycle.

The method of the present invention, in which the K-Mn-O compound is used in a two-step cyclic mode to remove dilute $H_2S$ from mixed gas streams, is illustrated with reference to FIG. 3. The cycle depicted in FIG. 3 consists of a relatively low temperature (from about 280° to about 300° C.) $H_2S$ removal portion (FIG. 3, a–b), and a relatively high temperature bed reoxidation-regeneration portion (FIG. 3, c–d), in the range 500° to 600° C. Argon is flushed through the system before and after the $H_2S$-containing gas is contacted with the bed, in order to prevent mixing of the hydrogen sulfide gas or the product sulfur vapors with the air stream used in bed reoxidation. The air flow may be continued throughout the heating and cooling portions of the cycle, or it may be introduced only briefly near the peak temperature (FIG. 3, p). The rate of oxidation becomes rapid only above about 500° C., therefore, a critical variable is the peak oxidation temperature.

The entire effluent, points a–c, FIG. 3, is collected in gas collector 22 and analyzed by gas chromatograph 24 (FIG. 1). The collection method provides for accurate measurement of the gas volumes, as well as a means of thoroughly mixing the gases to provide a uniform sample for analysis. The effluent gas from the bed oxidation step, (FIG. 3, c–d) contains no sulfur or sulfur compounds as it exits the reactor.

Figure 4:
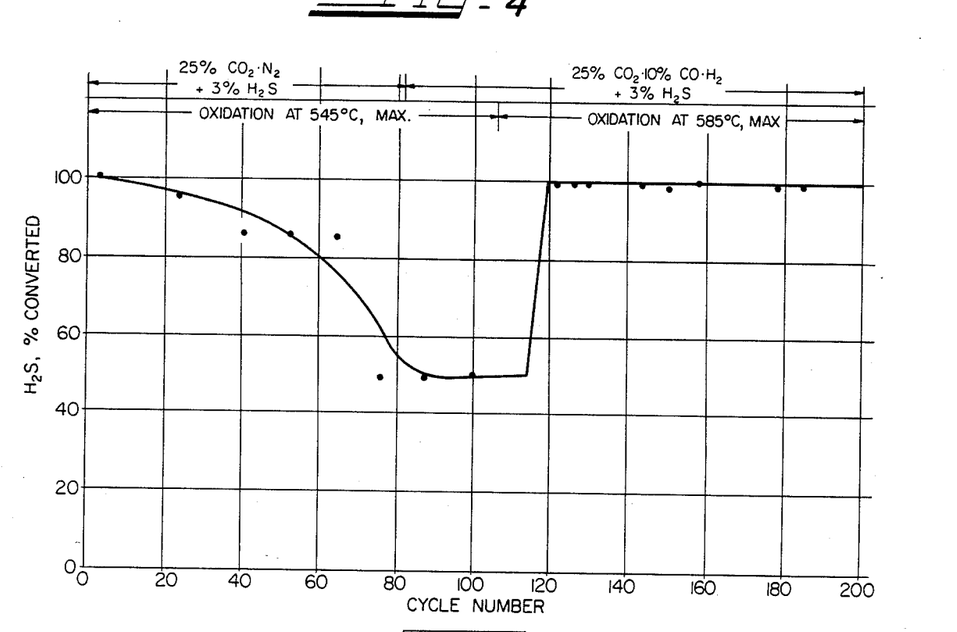
FIG. 4 is an illustration of the extent of $H_2S$ conversion by the K-Mn-O compound operated in the two-step cyclic mode.

The $H_2S$ removed from a mixed gas stream containing about of 24 vol. % $CO_2$, about 73 vol. % $N_2$, and about 3 vol. % $H_2S$ by the K-Mn-O compound operated in accordance with the cycle of FIG. 3, are shown in FIG. 4 as a function of the number of cycles. Steam was added to the extent of about 10 vol.% of the total. The high activity of the K-Mn-O pellets, freshly prepared by the method of Example 1, toward $H_2S$ removal is reflected by the conversion of about 90 to about 100% of the hydrogen sulfide to sulfur in the first 40 cycles in FIG. 4 (no $SO_2$ is found throughout the run). As the run progresses, cycles 40–80, less $H_2S$ (about 50% of that introduced) is removed. This reflects a loss of ability of the bed to reoxidize readily at the peak oxidation temperature of 545° C. The same performance is seen when the influent gas is replaced in cycle 82 with a mixed gas containing about 24% $CO_2$, 10% CO, 63% $H_2$ and about 3% $H_2S$. Within the limits of the ability to detect $H_2S$ in the effluent, $H_2S$ is quantitatively removed by increasing the peak oxidation temperature by 40° C. to 585° C. in cycles 120–185, FIG. 4.

During the first 120 cycles about 20% to about 40% of the $CO_2$ was removed. However, as the cycling continued, the amounts of $CO_2$ removed decreased continuously, until at the end of the run (cycle 185), the amount removed was less than about 5% of the $CO_2$ influent.

Similarly, some oxidation of CO to $CO_2$ occurred shortly after the influent stream was changed (at cycle 82) to the stream containing CO. Again, by the end of the run (cycle 185), the amount oxidation of CO had decreased to less than 5% of the influent CO.

EXAMPLE V

The K-Mn-O reactive compound, prepared as described in Example I acts as both a reagent as well as a catalyst in the conversion of hydrogen sulfide to sulfur. This activity is shown in FIG. 5 and described as follows.

A bed of K-Mn-O compound (65 g., 0.5 g-moles) placed in reactor 16 is subjected to a 50 cycle test. Each cycle consists of heating the K-Mn-O solid to 610° C. in $O_2$ at 50 psig. and then cooling the K-Mn-O solid to 300° C. with the $O_2$ pressure reduced to 1 atm. It is believed that this oxidation treatment increases the K-Mn-O "active" oxygen content. $H_2S$ (3.4%), $O_2$ (1%) and He (95.6%) are mixed and contacted with the reactive oxidizing solid at 300° C., and the effluent is analyzed by gas chromatography. No $O_2$ is found in the effluent.

Figure 5:
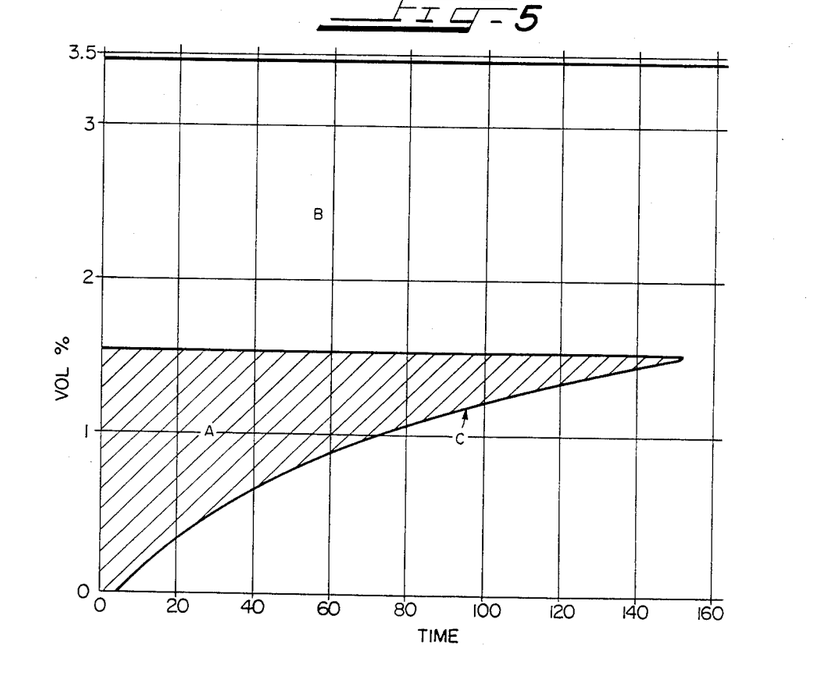
FIG. 5 is an illustration of the catalytic and reactive nature of the K-Mn-O compound.

As shown in curve C of FIG. 5, in the first five minutes of the test all $H_2S$ is removed (as established by effluent analysis), but as the run progresses $H_2S$ in the effluent is observed in increasing amounts. At 150 minutes, the $H_2S$ in the effluent has leveled off at about 1.5 vol. %. This leveling off is indicative of a nearly steady-state reaction, wherein the K-Mn-O compound is reacting predominantly as a catalyst. At steady state, about 1.9 vol. % of the $H_2S$ is being converted by the K-Mn-O catalyzed reaction of $H_2S$ and $O_2$. Thus, as shown in FIG. 5, the conversion of $H_2S$ occurs through reaction with "active" oxygen (Area A, FIG. 5) and through catalytic reaction (Area B, FIG. 5).

The $SO_2$ in the effluent varied throughout the run between 0.09 and 0.17 vol. %, with the average being approximately 0.12 vol. %. This value supports the conclusion that influent $O_2$ reacts with the K-Mn-O compound more rapidly than it reacts with the sulfur produced by the $H_2S$ conversion. This bed reaction with oxygen would thus appear to regenerate the K-Mn-O reactive solid by reincorporating the active oxygen for further conversion of the hydrogen sulfide to sulfur. This partitioning of the reaction of gaseous oxygen between the K-Mn-O compound and sulfur is typical for the ratio of $O_2/H_2S$ in the feed of about 0.3, as will be illustrated further in Example VI.

EXAMPLE VI

The variation in the extent of hydrogen sulfide conversion and of sulfur dioxide formation catalyzed by the K-Mn-O compound is demonstrated as follows.

Figure 6:
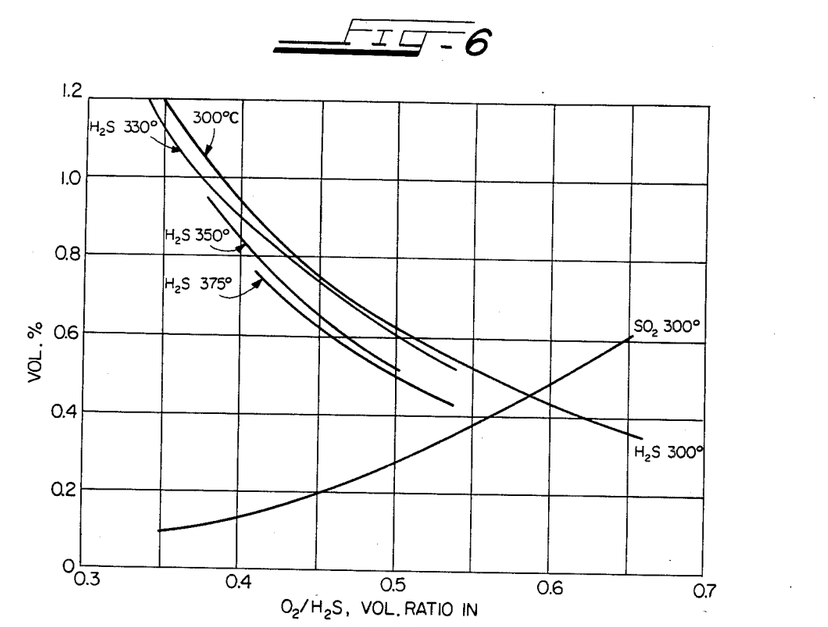
FIG. 6 is an illustration of the extent to which the K-Mn-O compound converts hydrogen sulfide at various oxygen-hydrogen sulfide volume ratios, and at various temperatures, and the extent to which sulfur dioxide is formed.

The K-Mn-O compound (40 g), is contacted with 3% $H_2S$ in an inert helium carrier containing $O_2$ in $O_2/H_2S$ vol. ratios ranging from about 0.35 to 0.65, at 300° C. and a flow rate of 160 cc/min. The effluent is analyzed by gas chromatography. No $O_2$ is found in the effluent. As seen in FIG. 6, as the $O_2/H_2S$ ratio increases over the range, the amount of $H_2S$ found in the effluent decreases from about 1.2% to about 0.35%. In other words, the amount of $H_2S$ removed from the gas stream increased from about 1.8% to about 2.65%. In addition, as the $O_2/H_2S$ ratio increases over the identified range, the amount of $SO_2$ found in the effluent increases from about 0.1% to about 0.6%. As also seen in FIG. 6, raising the temperature causes an increase in the amount of $H_2S$ converted. No change in $H_2S$ conversion or $SO_2$ formation can be detected over a range of flow rates between 65 and 650 cm/min.

Figure 7:
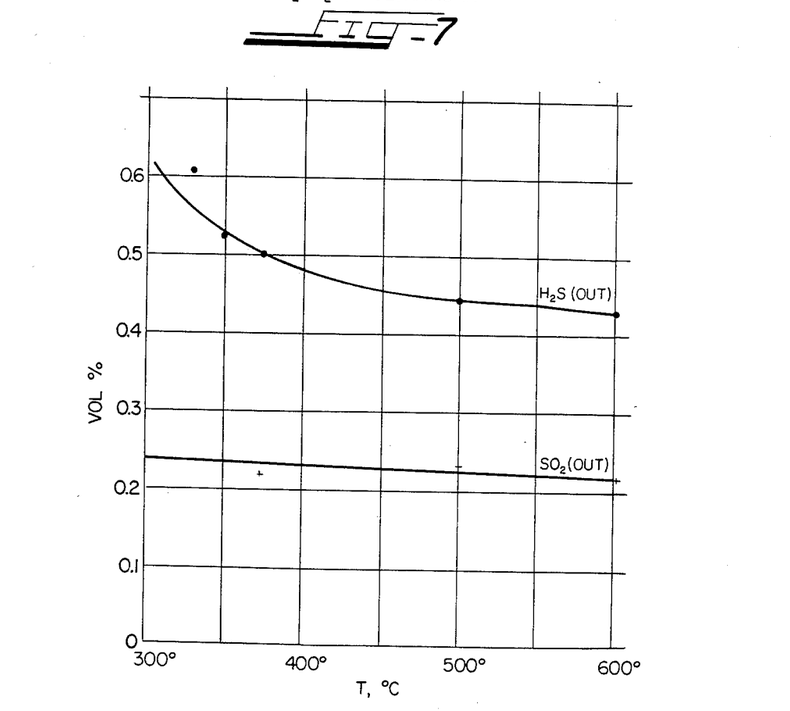
FIG. 7 is an illustration of the temperature dependence of the $H_2S$ removal and $SO_2$ formation from a mixture containing 3% $H_2S$ by the K-Mn-O compound operated in the catalytic mode.

The O₂/H₂S ratio of 0.50 is chosen as the point of comparison between a series of runs at temperatures between 300° and 600° C. At each temperature, flow rates are varied from as low as 65 cc/min. to as high as about 650 cc/min. and no change in the extent of $H_2S$ conversion or of $SO_2$ formation is observed. As shown in FIG. 7, about 80% of the $H_2S$ is converted at 300° C. The amount of $H_2S$ converted is slightly increased and the amount of $SO_2$ formed is slightly decreased by raising the reaction temperature from about 300° C. to about 600° C. The $SO_2$ concentration is, in all cases, very close to one half the concentration of unconverted $H_2S$.

This temperature dependence shows that the Claus Reaction, Reaction 3, cannot be involved to any major extent, because the thermodynamics of Reaction 3, while quite favorable at 300° C., becomes quite unfavorable as the temperature is raised to about 600° C. The results are better explained as a favorable partitioning of the reaction of the influent $O_2$, with the $O_2$ reacting more rapidly with the bed of K-Mn-O pellets than it reacts with the product sulfur vapor. The $O_2$ which reacts with the K-Mn-O pellets forms active bed oxygen which subsequently enters into Reaction 1.

EXAMPLE VII

The K-Mn-O is contacted with 5% $H_2S$ in a helium carrier and mixed with $O_2$ at an $O_2/H_2S$ ratio of 0.5 at temperatures between about 400° C. and about 550° C. and a space velocity of about 4000 to about 4200 $hr^{-1}$. The effluent gas is analyzed by gas chromatography.

Figure 8:
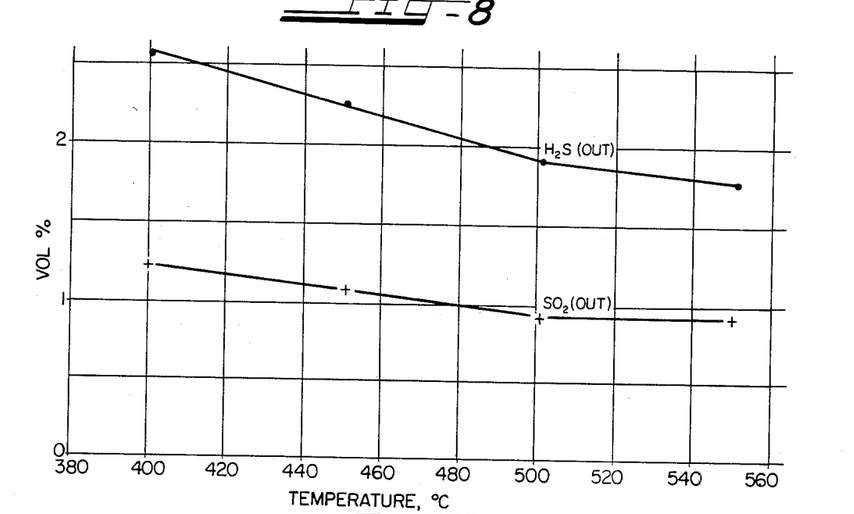
FIG. 8 is an illustration of $H_2S$ conversion and $SO_2$ formation from a mixture containing 5% $H_2S$ at various temperatures by the K-Mn-O compound operated in the catalytic mode.

As shown in FIG. 8, about 2.5% of the $H_2S$ is converted at 400° C. and about 3.25% of the $H_2S$ is converted at about 550° C. Thus, over this temperature range, $H_2S$ conversion efficiencies increase from about 40% to in excess of 60%. Throughout the temperature range, $SO_2$ concentration in the effluent is approximately one-half the concentration of the unconverted $H_2S$.

Figure 9:
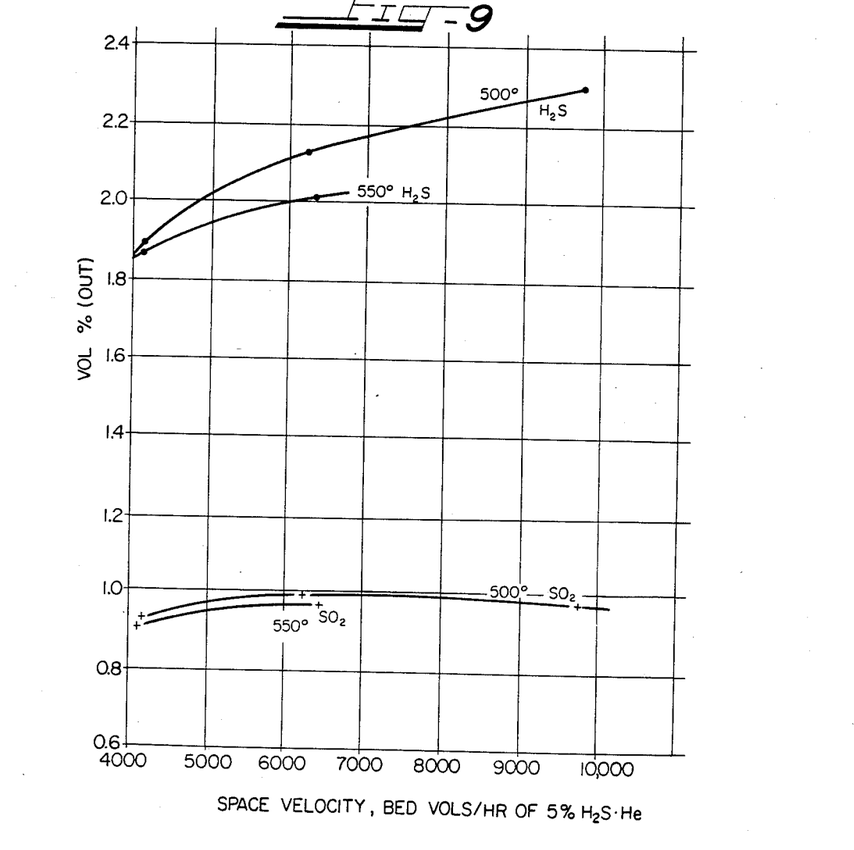
FIG. 9 is an illustration of the $H_2S$ conversion and $SO_2$ formation versus space velocity by the K-Mn-O compound operated in the catalytic mode.

As shown in FIG. 9, if the space velocity of the influent gas (5% $H_2S$, helium carrier, $O_2/H_2S$ ratio of 0.5) is increased from about 4000 $hr^{-1}$ up to 10,000 $hr^{-1}$ between about 500° C. and about 550° C., only a small decrease in $H_2S$ conversion occurs. At 500° C., the $H_2S$ conversion decreases from about 60% to about 50% over this range of space velocities. Above about 5000 $hr^{-1}$, the $SO_2$ concentration is measurably less than one-half the unconverted $H_2S$ concentration, and $O_2$ is found in the effluent. The sum of $O_2$ and $SO_2$, in all cases, closely approximates one-half the unconverted $H_2S$. Therefore, the decrease in $H_2S$ conversion at higher flow rates appears to be the result of $O_2$ bypassing the bed of K-Mn-O pellets.

Figure 10:
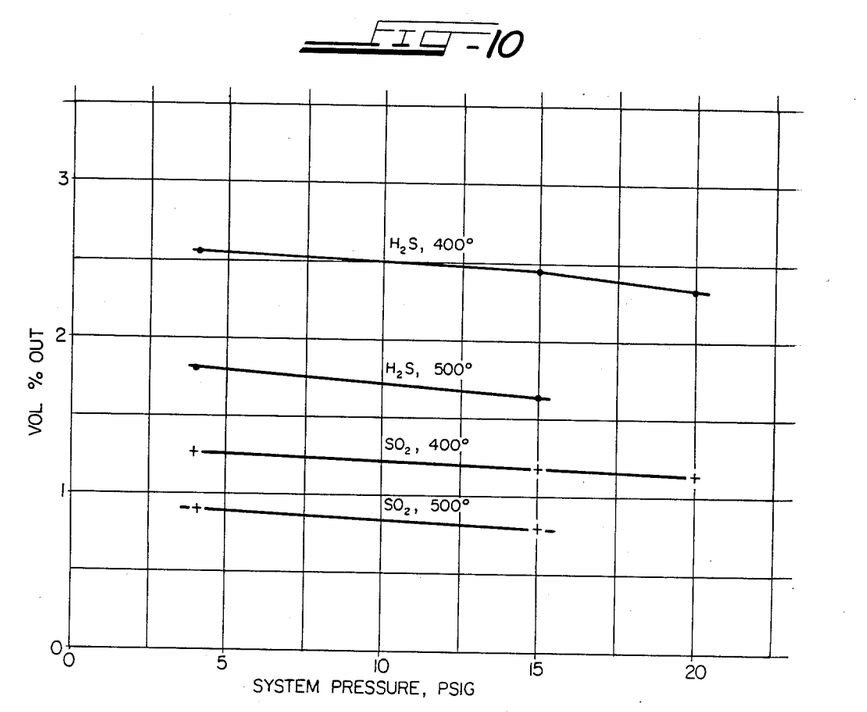
FIG. 10 is an illustration of $H_2S$ removal and $SO_2$ formation versus applied pressure of $H_2S$ by the K-Mn-O compound operated in the catalytic mode.

Similar tests, but with the system pressure varied between 4 and 20 psig., are run at 400° C. and 500° C. and at a space velocity of about 4000 $hr^{-1}$. As shown in FIG. 10, increasing the pressure of the influent $H_2S$ and $O_2$ mixture slightly increases the amount of hydrogen sulfide converted and slightly decreases the amount of sulfur dioxide formed.

EXAMPLE VIII

The ability of the K-Mn-O reactive solid to remove $CO_2$ from gas streams containing pure $CO_2$ is demonstrated as follows. Pellets of the K-Mn-O compound, prepared as described in Example I (61 g, 0.46 g-mole) are loaded into the reactor 16 shown in FIG. 1 and subjected to the following cycle: At 280° C., pressurized carbon dioxide is introduced for two minutes. The pellet bed is then heated to about 500° C. with air flowing at 1 atm. Upon cooling to about 280° C., the cycle is repeated. The $CO_2$ content of the effluent air is analyzed by scrubbing with standardized sodium hydroxide solution.

Figure 11:
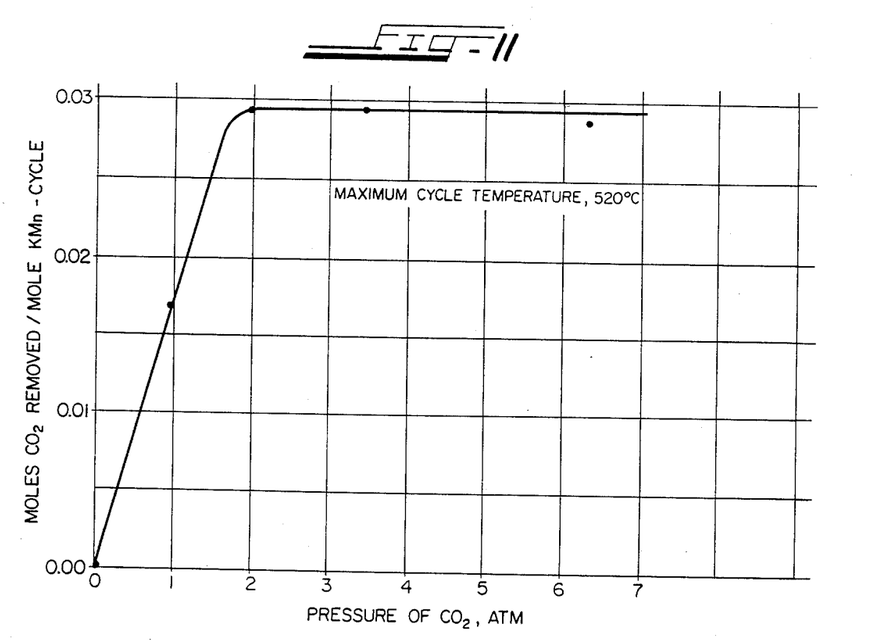
FIG. 11 is an illustration of the removal of pure $CO_2$ at various pressures by the K-Mn-O compound.

As seen in FIG. 11, the amount of $CO_2$ removed increases with $CO_2$ pressure up to about 2 atm. and does not increase further with increased $CO_2$ pressure. The capacity of the bed is about 0.03 g-moles $CO_2$ per g-mole of K-Mn-O compound at pressures above about 2 atm. At 1 atm. of applied $CO_2$ pressure, about 0.017 moles of $CO_2$ are removed per mole of K-Mn-O compound. No change in this capacity is observed if this cycle is repeated for 79 cycles.

EXAMPLE IX

The K-Mn-O reactive solid containing alumina as prepared in Example II removes carbon dioxide from mixed gas streams containing carbon dioxide and nitrogen as follows. The reactor 16, shown in FIG. 1, is loaded with 59 g of the pelletized K-Mn-O compound containing alumina and subjected to the following cycle. The reactor is flushed with argon and the K-Mn-O compound is contacted with 25% $CO_2$ in $N_2$ at 50 psig and a space velocity of about 1000 $hr^{-1}$ at about 290° C. The reactor is flushed with argon at 50 psig. The reactor was then heated to 585° C. with flowing air at 50 psig. Air flow is continued as the reactor cools to about 300° C., and the cycle is repeated.

The effluents from the 25% $CO_2$, $N_2$ stream and the subsequent argon flush are collected, the volumes of the two gas samples are measured separately, the two samples are thoroughly mixed. The resulting mixed gas is analyzed for $CO_2$ by gas chromatography. From the analytical results, the amounts of $CO_2$ in the influent and effluent are calculated.

In the first cycle 59 g of the K-Mn-O compound containing alumina removes about 130 cc of $CO_2$ (measured at standard temperature and pressure). This removal decreases rapidly to less than about 20 cc of $CO_2$ by the 18th cycle. At this point steam is added throughout the cycle for 5 cycles with no measurable effect. Cycling is continued for 15 more cycles, with no steam added, with the $CO_2$ removal at less than 10 cc.

Further tests are made with varying amounts of steam added to the $H_2S$ stream only, and the optimum $CO_2$ removal from the 25% $CO_2$, $N_2$ stream, at about 140 cc of $CO_2$ occurrs when the volume of steam introduced is about twice the volume of 25% $CO_2$-$N_2$.

In addition to the K-Mn-O compound described above, a reactive compound containing potassium, iron and oxygen (hereinafter the "K-Fe-O compound"), described more fully hereinafter, undergoes reactions analogous to those of the K-Mn-O compound. Based upon experimental results, it is believed that the K-Fe-O compound is reduced and hydrogen sulfide is oxidized to elemental sulfur and water according to the following reaction:

$$KFeO_{x+y} + Y\ H_2S \rightarrow KFeO_x + Y\ H_2O + Y\ S(v) \qquad (10)$$

The K-Fe-O reactive solid may be regenerated by flowing oxygen or air over the reduced K-Fe-O solids, as shown in the following reaction:

$$KFeO_x + Y/2\ O_2 \rightarrow KFeO_{x+y} \qquad (11)$$

Thus, the net of reactions (10) and (11) is:

$$Y\ H_2S + Y[O] \rightarrow Y\ H_2O + Y\ S(v) \tag{12}$$

wherein [O] designates the active oxygen provided by the K-Fe-O compound.

EXAMPLE X

Preparation of the reactive solid containing potassium, iron, and oxygen proceeds as follows: ferric nitrate hydrate, $Fe(NO_3)_3 \cdot 9H_2O$ (172 g, 0.43 gram-moles), is added with stirring to 300 grams of melted KOH. The resultant mixture is heated to slightly above 360° C. The green melt is cooled, broken up, and stirred into 500 ml of cold 50% potassium hydroxide solution. An insoluble brown precipitate is recovered by filtration. The precipitate is reslurried once in cold 1M KOH and refiltered. The filter cake is dried at 100° C. in a nitrogen atmosphere. The recovered dry product weighs 100 grams. The dry product is pelletized by the method of Example I.

EXAMPLE XI

The method of the present invention, in which the K-Fe-O compound, prepared as described in Example X, is used in a two-step cyclic mode, is illustrated in this example. Pellets, weighing 37 g, are placed in reactor 16 of FIG. 1 and subjected to six cycles in which they are heated to about 620° C. in flowing He, then oxidized 1 hour at about 650° C. at about 80 psig of oxygen and cooled to room temperature under 1 atm of oxygen. About 40 cc (measured at standard temperature and pressure) of oxygen is evolved during heating to about 650° C. with the major fraction evolved above 400° C. When the K-Fe-O compound is oxidized for about 15 hours under 80 psig of oxygen, the total $O_2$ evolution increases to about 60 cc.

Figure 12:
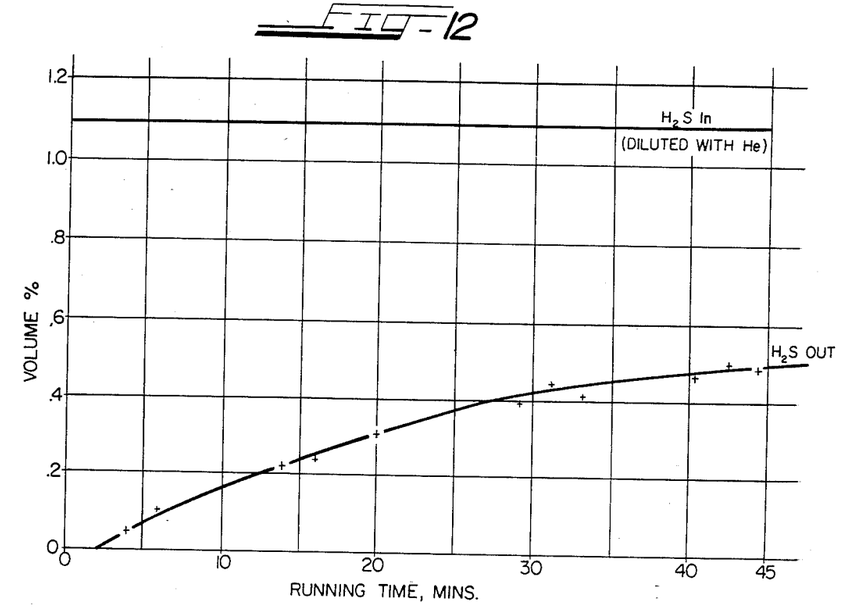
FIG. 12 is an illustration of the conversion of hydrogen sulfide by the K-Fe-O compound as a function of exposure time.

The bed of K-Fe-O pellets is subjected to four cycles in which it is contacted with a stream of 1.1% $H_2S$ diluted with a helium carrier followed by oxidation and regeneration. The results of the fifth such cycle is shown in FIG. 12. The K-Fe-O was first reoxidized in 1 atm $O_2$ at 288° C. for 20 minutes. A 14° C. temperature rise in the bed occurs during the first minute of reoxidation. Reoxidation is completed over the next 15 hours at 500° C. under 1 atm $O_2$, and the reactor is cooled to about 290° C. A stream of 1.1% $H_2S$ in He is contacted with the bed at a space velocity of 1200 hr$^{-1}$. No $H_2S$ is found in the effluent for the first 2 minutes; however, at the end of the 45 minute run the effluent contains nearly 0.5 vol. % $H_2S$. In other words, at the beginning of the run, all $H_2S$ in the gas stream was converted to S. After 45 minutes, about 0.6 vol % $H_2S$ was converted to S. The total amount of $H_2S$ converted is about 220 cc (measured at standard temperatures and pressure.) After the run, reoxidation under 1 atm $O_2$ at 288° C. produces a 10° C. temperature rise. A small amount of $SO_2$, constant at 0.03 vol. %, is observed throughout the run, indicating that the strongly oxidized bed evolves a small amount of $O_2$ into the mixed gas stream, which $O_2$ enters into a gas phase oxidation of the sulfur product. Alternatively, $SO_2$ may result from the oxidation of a bed sulfide which may be formed under these conditions.

EXAMPLE XII

The K-Fe-O prepared as described in Example X reacts as a catalyst in the conversion of $H_2S$ to sulfur in the presence of $O_2$. The K-Fe-O bed of pellets (37 g) is subjected at 290° C. to a mixed gas stream containing from about 2.4 to about 2.6 vol. % $H_2S$, and 1.9 vol. % $O_2$ in a helium carrier at a space velocity of 1200 hr$^{-1}$. The run is continued until steady state is reached as judged by the composition of the product gasses. The effluent gas is analyzed by gas chromatography. Additional runs are made in a similar manner and are summarized in Table 1. The results in Table 1 indicate, from the large values of sulfur relative to $SO_2$, that reaction (1) is the major reaction. In addition, as the $O_2/H_2S$ volume ratio decreases, the amount of $SO_2$ formed and the amount of $H_2S$ reacted both decrease.

TABLE 1

| INFLUENT $O_2/H_2S$ VOL. RATIO | PRODUCT COMPOSITION, VOL. % | | | |
|---|---|---|---|---|
| | $H_2S$ | $SO_2$ | $O_2$ | S(v)* |
| 0.77 | 0.12 | 0.70 | 0.05 | 1.6 |
| 0.73 | 0.13 | 0.66 | 0.09 | 1.8 |
| 0.64 | 0.30 | 0.51 | 0.03 | 1.8 |
| 0.57 | 0.48 | 0.28 | 0.09 | 1.8 |

*S(v) is calculated by subtracting effluent vol % $H_2S$ and effluent vol % $SO_2$ from influent vol % $H_2S$.

The foregoing Table 1 clearly establishes that the K-Fe-O compound possesses catalytic activity for the conversion of $H_2S$ to sulfur.

In addition to the K-Mn-O and K-Fe-O compounds, a reactive solid containing potassium, copper and oxygen (hereinafter the "K-Cu-O compound") was investigated. It is believed that that compound undergoes reactions analogous to those of the K-Mn-O and K-Fe-O compounds. Based on experimental results, it is also believed that the K-Cu-O compound is reduced and hydrogen sulfide is oxidized to form elemental sulfur and water as shown in the following reaction:

$$KCuO_{x+y} + Y\ H_2S \rightarrow KCuO_x + Y\ H_2O + Y\ S \tag{13}$$

The K-Cu-O reactive solid is regenerated by flowing air or oxygen across the solid, as shown in Reaction (14):

$$KCuO_x + Y/2\ O_2 \rightarrow KCuO_{x+y} \tag{14}$$

Thus, the net of Reactions (13) and (14) is the following:

$$Y\ H_2S + Y[O] \rightarrow Y\ H_2O + Y\ S \tag{15}$$

where [O] designates the active oxygen fixed in the K-Cu-O reactive solid.

The preparation of the K-Cu-O reactive solid and the use of the solid so produced are described in the following examples.

EXAMPLE XIII

The K-Cu-O reactive solid is made as follows. Copper nitrate hydrate (150 g. 0.645 moles) is dissolved in 200 ml. of water. A solution of 280 grams of potassium hydroxide in 280 ml. of water is added with stirring. Chopped ice is placed in the solution to prevent dehydration of the gelatinous copper hydroxide product. The supernatant liquid is decanted and the gelatinous product is filtered and air dried. The moist gel is pressed into pellets about 0.2" thick and 1" diameter at about 2000 psig. The pellets are dried at 150° C. for one hour and then broken into small pieces. The pellets are baked at 500° C. for one hour in a carbon dioxide atmosphere to decompose residual nitrate and to convert free potassium hydroxide to carbonate. The recovered product weighs 65 grams and has a bulk volume of 70 cc.

EXAMPLE XIV

A bed of K-Cu-O compound (35 grams), prepared as described in Example XIII, is subjected to an 850 cc/min. flow of 3% $H_2S$ in He for 1 min. at 283° C., then heated to a temperature of between 360° C. and about 500° C. for oxidation and regeneration in the presence of pressurized $O_2$ in a repetitive cycle similar to that depicted in FIG. 3. The pressurized $O_2$ is introduced for a 3 minute period which encompasses the peak oxidation temperature.

Figure 13:
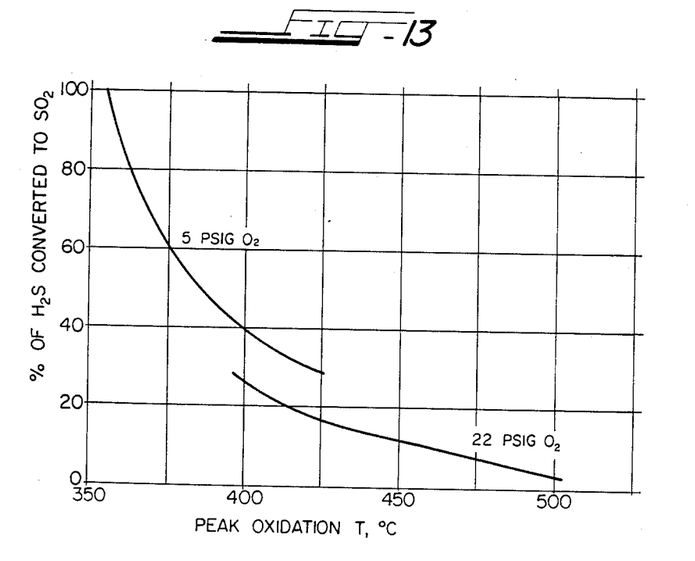
FIG. 13 is an illustration of the extent of hydrogen sulfide conversion to sulfur dioxide as a function of oxygen pressure and bed oxidation regeneration temperature of the K-Cu-O compound.

As shown in FIG. 13, in all runs all the $H_2S$ is completely converted to a mixture of sulfur or $SO_2$. The amount of $H_2S$ converted to either sulfur or $SO_2$ depends upon the oxidation temperature and applied oxygen pressure. When the oxidation temperature is about 360° C., $O_2$ is applied, only $SO_2$, and no sulfur, is found in the effluent stream. When the regeneration temperature is increased to 500° C. with application of 22 psig. $O_2$, only 2% of the $H_2S$ is converted to $SO_2$ and 98% is converted to sulfur. Higher temperatures above about 500° C. cannot be used in the regeneration of the K-Cu-O reactive compound because the pelletized bed tends to develop resistance to gas flow.

The K-Cu-O compound resembles the K-Mn-O and K-Fe-O compounds previously discussed, and its ability to convert $H_2S$ to sulfur depends upon the extent that it contains active oxygen obtained during the regeneration step. It differs from the K-Fe-O and K-Mn-O compounds in that it continues to react rapidly with $H_2S$ after its active oxygen content is depleted, in this case forming $SO_2$, and not sulfur, as the product.

The thermodynamics of the one-step formation of sulfur from hydrogen sulfide according to Reaction (1) are very favorable, and therefore quantitative conversion of $H_2S$ by this reaction, involving the alkaline metal oxide, might be predicted. Reaction (1) is carried out on large industrial scale in the Claus process. In the Claus process, Reaction (1) is a combination of Reactions (2) and (3), set forth previously. The thermodynamics of Reaction (3) are less favorable than those of either Reaction (2) or Reaction (1). Because of this, the less favorable thermodynamics of Reaction (3) control the efficiencies of the Claus process.

In the present invention, conversion of $H_2S$ to sulfur through the use of the D-M-O compound does not involve intermediate Reactions (2) and (3) and therefore is not affected by the less-favorable thermodynamics of Reaction (3). For example, the quantitative conversion of $H_2S$ within the limits of detection, as observed in Example IV, could not be accomplished under the same pressure and temperature conditions in the Claus process. Although the Claus process also makes use of a solid catalyst, the mechanistic path must differ from that operative on the D-M-O compound in the catalysis of Reaction (1). This difference in mechanistic path might be expected, considering that the reactivity of the D-M-O compound toward hydrogen sulfide depends upon its capability for reaction with oxygen, a capability not present in the Claus process catalyst.

The high activity of the D-M-O compound as a catalyst for the conversion of $H_2S$ and $O_2$ directly to sulfur opens possibilities for practical application, not only in coal conversion, but also in related technology currently in use on large scale. For example, if the $O_2/H_2S$ ratio in the influent gas stream is 0.5, the product stream will contain $SO_2$ and unreacted $H_2S$ in the ratio of 0.5. This is the ratio needed for the Claus process (Reactions (2) and (3)). Thus, a Claus catalytic chamber placed downstream of a process based on the method of the present invention should result in a near complete conversion of unreacted gas (a small fraction of the total load) to sulfur.

Thus, while the method of the present invention has been described with respect to certain processes for using the oxidizing reactive solid, and examples have been given of the use of specific oxidizing reactive solids, the invention is not deemed to be limited thereby. As one skilled in the art will appreciate, modifications and changes may be made while still falling within the scope and spirit of the present invention. Accordingly, all such modifications and changes are deemed to fall within the present invention.

I claim:
1. A process for recovering sulfur by converting hydrogen sulfide in a gas stream by direct oxidation of such hydrogen sulfide to elemental sulfur vapor, said gas stream comprising hydrogen, water vapor, hydrogen sulfide, carbon monoxide, carbon dioxide, sulfur vapor, methane, and other hydrocarbon gases, and mixtures thereof comprising the steps of;
   (a) Contacting, at temperatures from about 300° C. to about 700° C., said gas stream with a reactive solid of the general formula D-M-O, wherein D is chosen from the alkali metals or alkaline earth metals consisting of sodium, potassium, lithium, calcium, or magnesium and M represents a transition metal selected from the group consisting of manganese, copper, and iron, and groups IB, VB, VIB, VIIB or VIII of the Periodic Table; and O designates oxygen;
   (b) Condensing said elemental sulfur vapor to thereby recover the same; and
   (c) Regenerating said reactive solid by flowing an air stream over the solid which results from step (a) at about atmopsheric pressure for such a time and at such a temperature sufficient to regenerate said reactive solid.
2. A method for the preparation of the D-M-O reactive solid containing alumina wherein D is potassium, M is manganese and O is oxygen, comprising the steps of:
   (a) dissolving potassium permanganate in water,
   (b) adding, to the potassium permanganate solution resulting from step (a), about 0.01 to about 0.20 mole of aluminum nitrate per mole of potassium permanganate in said solution,
   (c) drying the solution resulting from step (b) to a solid,
   (d) heating the resultant solid to temperatures between about 600° C. to about 900° C. under an inert atmosphere for about one-half hour,
   (e) cooling the solid resulting from step (d) to about room temperature, and
   (f) pressing the solid into cylindrical disks.
3. A method for the preparation of the D-M-O reactive solid containing alumina wherein D is potassium, M is iron, and O is oxygen, comprising the steps of:
   (a) adding ferric nitrate to melted potassium hydroxide in the ratio of one mole of ferric nitrate to about 8 to about 12 moles of melted potassium hydroxide,
   (b) adding, to the slurry resulting from step (a), about 0.01 to about 0.20 mole of aluminum nitrate per mole of ferric nitrate in said slurry,

(c) heating the mixture resulting from step (b) to about 360° C.,
(d) cooling the mixture resulting from step (c) to about room temperature,
(e) adding the mixture resulting from step (d) into an excess of cold 50% potassium hydroxide solution,
(f) filtering the insoluble brown precipitate product,
(g) washing the filtrate resulting from step (f) in about 1 molar potassium hydroxide solution while maintaining said solution at about 0° C. to about 10° C.,
(h) refiltering the brown precipitate,
(i) drying the solid resulting from step (h), and
(j) pressing the solid into cylindrical disks.

4. A method for the preparation of the D-M-O reactive solid containing alumina wherein D is potassium, M is copper, and O is oxygen, comprising the steps of:
(a) dissolving copper nitrate in water,
(b) adding, to the copper nitrate solution resulting from step (a), about 0.01 to about 0.20 mole of aluminum nitrate per mole of copper nitrate in said solution,
(c) adding 50% potassium hydroxide solution to the solution resulting from step (b) while stirring and chilling,
(d) removing the supernatant liquid from the solution resulting from step (c),
(e) drying the solid resulting from step (d), and
(f) pressing the solid resulting from step (e) into cylindrical disks.

5. A method for recovering sulfur by converting hydrogen sulfide in a gas stream by direct oxidation of the hydrogen sulfide to elemental sulfur vapor comprising the steps of mixing said gas stream with gaseous oxygen present in an approximate stoichiometric amount for the direct conversion of hydrogen sulfide to elemental sulfur vapor; contacting said mixed gas stream at a temperature above about 300° C. with a reactive solid of the general formula D-M-O wherein D is chosen from the alkali metals and alkaline earth metals; M represents a transition metal selected from the group consisting of manganese, copper, iron and groups VB, VIB, VIIB, VIII and IB of the Periodic Table; and O represents oxygen, to convert said hydrogen sulfide to elemental sulfur vapor by direct oxidation; and condensing said elemental sulfur vapor to thereby recover the same.

6. The method defined in claim 5 wherein said mixed gas stream is contacted with said reactive solid at a temperature below about 700° C.

7. The method defined in claim 5 wherein D is potassium, M is manganese and O is oxygen.

8. The method defined in claim 5 wherein D is potassium, M is iron and O is oxygen.

9. The method defined in claim 5 wherein D is potassium, M is copper and O is oxygen.

10. A method for recovering sulfur by converting hydrogen sulfide in a gas stream by direct oxidation of such hydrogen sulfide to elemental sulfur vapor comprising the steps of:
(a) contacting said gas stream at a temperature above about 300° C. with a reactive solid of the general formula D-M-O wherein D is chosen from the alkali metals or alkaline earth metals and M represents a transition metal selected from the group consisting of manganese, copper and iron, and groups IB, VB, VIB, VIIB, VIII of the Periodic Table; and O designates oxygen to convert said hydrogen sulfide to elemental sulfur vapor by direct oxidation;
(b) condensing said elemental sulfur vapor; and
(c) reoxidizing said reactive solid upon completion of step (a) by flowing an oxygen containing gas stream over the reactive solid at about atmospheric pressure for such a time and at such a temperature whereby oxygen in said gas stream reacts with said reactive solid to reoxidize the same.

11. A method as claimed in claims 5 or 10 wherein D is potassium, M is manganese, and O is oxygen, with said reactive solid prepared by heating potassium permanganate to temperatures between about 500° C. and about 900° C. in the presence of an inert gas.

12. A method as claimed in claim 5 or 10 wherein D is potassium, M is manganese and O is oxygen, with said reactive solid prepared by (a) dissolving potassium permanganate in water, (b) adding about 0.01 to about 0.20 mole of aluminum nitrate per mole of potassium permanganate to the potassium permanganate solution, (c) drying the solution to a solid, and (d) heating the resultant solid to temperatures between about 600° C. to about 900° C. under an inert atmosphere.

13. A method as claimed in claim 5 or 10 wherein D is potassium, M is iron, and O is oxygen, with said reactive solid prepared by (a) adding ferric nitrate hydrate to an excess of potassium hydroxide, (b) heating the mixture to about 360° C., (c) cooling the mixture, (d) adding the cooled mixture into an excess of concentrated, cold potassium hydroxide solution, (e) filtering the product, an insoluble brown precipitate, (f) washing the filtrate in cold dilute potassium hydroxide, (g) refiltering the brown precipitate, and (h) drying the solid.

14. A method as claimed in claim 5 or 10 wherein D is potassium, M is copper, and O is oxygen, with said reactive solid prepared by (a) dissolving copper nitrate hydrate in water, (b) adding concentrated potassium hydroxide solution with stirring and chilling, (c) decanting the supernatant liquid, (d) filtering the product, and (e) drying the solid.

15. The method defined in claim 5 wherein said gas stream is contacted with said reactive solid at a temperature below about 700° C.

16. The method defined in claim 5 wherein D is potassium, M is manganese and O is oxygen.

17. The method defined in claim 5 wherein said oxygen containing gas stream is air.

18. The method defined in claim 5 wherein said oxygen containing gas stream is oxygen.

19. The method defined in claim 10 wherein D is potassium, M is iron and O is oxygen.

20. The method defined in claim 10 wherein D is potassium, M is copper and O is oxygen.

* * * * *

UNITED STATES PATENT AND TRADEMARK OFFICE
CERTIFICATE OF CORRECTION

PATENT NO. : 4,550,098

DATED : October 29, 1985

INVENTOR(S) : GENS, Theodore A.

It is certified that error appears in the above-identified patent and that said Letters Patent are hereby corrected as shown below:

Claims 15, 16, 17 and 18 should all depend from claim 10, not claim 5.

In column 8, line 12, after furnace, insert ---and the furnace is heated ---.

Signed and Sealed this

Twelfth Day of August 1986

[SEAL]

Attest:

Attesting Officer

DONALD J. QUIGG

Commissioner of Patents and Trademarks